US012438310B2

(12) United States Patent
Liu et al.

(10) Patent No.: US 12,438,310 B2
(45) Date of Patent: Oct. 7, 2025

(54) ELECTRONIC DEVICE AND SOCKET MODULE AND METAL SHIELDING FRAME THEREOF

(71) Applicant: Wistron NeWeb Corp., Hsinchu (TW)

(72) Inventors: Chih-Chun Liu, Hsinchu (TW); Wei-Jie Huang, Hsinchu (TW); Jyun-Kai Huang, Hsinchu (TW); Chun-Yu Lee, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 388 days.

(21) Appl. No.: 17/815,819

(22) Filed: Jul. 28, 2022

(65) Prior Publication Data

US 2023/0178939 A1 Jun. 8, 2023

(30) Foreign Application Priority Data

Dec. 7, 2021 (TW) ................................ 110145608

(51) Int. Cl.
*H01R 13/6583* (2011.01)
*H01R 13/422* (2006.01)

(52) U.S. Cl.
CPC ..... *H01R 13/6583* (2013.01); *H01R 13/4226* (2013.01)

(58) Field of Classification Search
CPC ............ H01R 13/6583; H01R 13/4226; H01R 13/6594; H01R 24/62
See application file for complete search history.

(56) References Cited

U.S. PATENT DOCUMENTS 5,755,595 A * 5/1998 Davis ................. H01R 13/6582 439/607.01
6,086,420 A 7/2000 Wu
6,193,554 B1 * 2/2001 Wu ........................ H01R 24/62 439/607.25
6,264,504 B1 7/2001 Wu
6,343,956 B2 * 2/2002 Stickney ............ H01R 13/6582 439/607.17
6,344,956 B1 * 2/2002 Morita ................. H10N 60/355 361/19
6,997,748 B1 * 2/2006 Su ...................... H01R 13/6582 439/607.55
9,502,826 B1 11/2016 Young et al.
(Continued)

FOREIGN PATENT DOCUMENTS

CN 204045859 U 12/2014
CN 211088601 U 7/2020
(Continued)

*Primary Examiner* — Briggitte R. Hammond
(74) *Attorney, Agent, or Firm* — McClure, Qualey & Rodack, LLP

(57) ABSTRACT

A metal shielding frame is provided. The metal shielding frame is adapted to be disposed in a socket, wherein the socket is adapted to be electrically connected to a connector. The metal shielding frame includes a sleeve-shaped frame body and at least one ground hemming portion. The sleeve-shaped frame body includes a first enclosed edge. The ground hemming portion is formed on the first enclosed edge. The socket includes a socket case and a socket joint. The socket case surrounds the socket joint. The sleeve-shaped frame body is adapted to be inserted between the socket case and the socket joint.

14 Claims, 11 Drawing Sheets

(56) References Cited

U.S. PATENT DOCUMENTS

| | | | | |
|---|---|---|---|---|
| 10,490,940 | B2 * | 11/2019 | Ju | H01R 13/6594 |
| 2012/0190228 | A1 * | 7/2012 | Lee | H01R 13/7172 439/271 |
| 2014/0099824 | A1 * | 4/2014 | Chou | H01R 12/716 439/620.15 |

FOREIGN PATENT DOCUMENTS

| | | | |
|---|---|---|---|
| TW | M542269 | U | 5/2017 |
| WO | 98/02940 | A1 | 1/1998 |

* cited by examiner

ELECTRONIC DEVICE AND SOCKET MODULE AND METAL SHIELDING FRAME THEREOF

CROSS REFERENCE TO RELATED APPLICATIONS

This Application claims priority of Taiwan Patent Application No. 110145608, filed on Dec. 7, 2021, the entirety of which is incorporated by reference herein.

BACKGROUND OF THE INVENTION

Field of the Invention

The present invention relates to a metal shielding frame, and in particular to a metal shielding frame adapted to be utilized on a socket.

Description of the Related Art

USB 3.0, whose transmission speed reaches 4.8 Gbps, is a popular transmission specification utilized in electronic devices nowadays. However, the broadband noise generated by the USB 3.0 connector falls within the frequency range used by Wi-Fi 2.4G. This noise deteriorates the Wi-Fi signal transmission. In particular, the noise decreases the transmission speed and effective range of the Wi-Fi signal.

BRIEF SUMMARY OF THE INVENTION

Embodiments of the invention are provided to address the aforementioned difficulty.

In one embodiment, a metal shielding frame is provided. The metal shielding frame is adapted to be disposed in a socket, wherein the socket is adapted to be electrically connected to a connector. The metal shielding frame includes a sleeve-shaped frame body and at least one ground hemming portion. The sleeve-shaped frame body includes a first enclosed edge. The ground hemming portion is formed on the first enclosed edge. The socket includes a socket case and a socket joint. The socket case surrounds the socket joint. The sleeve-shaped frame body is adapted to be inserted between the socket case and the socket joint.

In one embodiment, the connector includes a connector case and a connector joint. The connector case surrounds the connector joint. A plurality of protrusions are formed on an inner wall of the sleeve-shaped frame body. The protrusions are adapted to abut the connector case.

In one embodiment, the metal shielding frame includes a plurality of elastic sheets. The connector includes a connector case and a connector joint. The connector case surrounds the connector joint. The sleeve-shaped frame body includes a second enclosed edge. The elastic sheets are formed on the second enclosed edge and extend to the interior of the sleeve-shaped frame body. The elastic sheets are adapted to be wedged into the connector case.

In one embodiment, a plurality of frame openings are formed on the sleeve-shaped frame body, the socket case includes a plurality of socket wedging portions, and the socket wedging portions are wedged into the frame openings.

In another embodiment, a socket module is provided. The socket module includes a socket and a metal shielding frame. The socket includes a socket case and a socket joint, wherein the socket case surrounds the socket joint. The metal shielding frame includes a sleeve-shaped frame body and at least one ground hemming portion, wherein the sleeve-shaped frame body includes a first enclosed edge, the ground hemming portion is formed on the first enclosed edge, and the sleeve-shaped frame body is located between the socket case and the socket joint.

In one embodiment, the socket and the metal shielding frame are integrally formed.

In one embodiment, the socket case includes a plurality of socket wedging portions, and the sleeve-shaped frame body covers the socket wedging portions.

In further another embodiment, an electronic device is provided. The electronic device includes a metal housing, a circuit board, a socket and a metal shielding frame. The circuit board is disposed in the metal housing. The socket is disposed on the circuit board, wherein the socket includes a socket case and a socket joint, and the socket case surrounds the socket joint. The metal shielding frame includes a sleeve-shaped frame body and at least one ground hemming portion. The sleeve-shaped frame body includes a first enclosed edge. The ground hemming portion is formed on the first enclosed edge. The sleeve-shaped frame body is located between the socket case and the socket joint. The ground hemming portion abuts the metal housing.

Compared to the conventional art (without utilizing the metal shielding frame), the metal shielding frame with no frame opening (for example, the metal shielding frame of the first, second or third embodiment) of the embodiment of the invention can decrease the noise radiation energy by 90%. Additionally, the metal shielding frame with the frame openings (for example, the metal shielding frame of the fourth embodiment) of the embodiment also can sufficiently reduce the noise radiation energy due to the grounding and tolerance compensation means.

The metal shielding frame of the embodiment of the invention can be directly inserted into the conventional socket to reduce noise interference. In one embodiment, the metal shielding frame compensates the tolerance so that the connector can be sufficiently connected to the socket, and the conventional problems of poor contact and noise leakage are prevented. In another embodiment, the metal shielding frame covers the gap around the socket wedging portions, and reduces noise interference. In further another embodiment, the metal shielding frame is grounded to the metal housing of the electronic device, and the noise is reduce by being transmitted to the metal housing.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
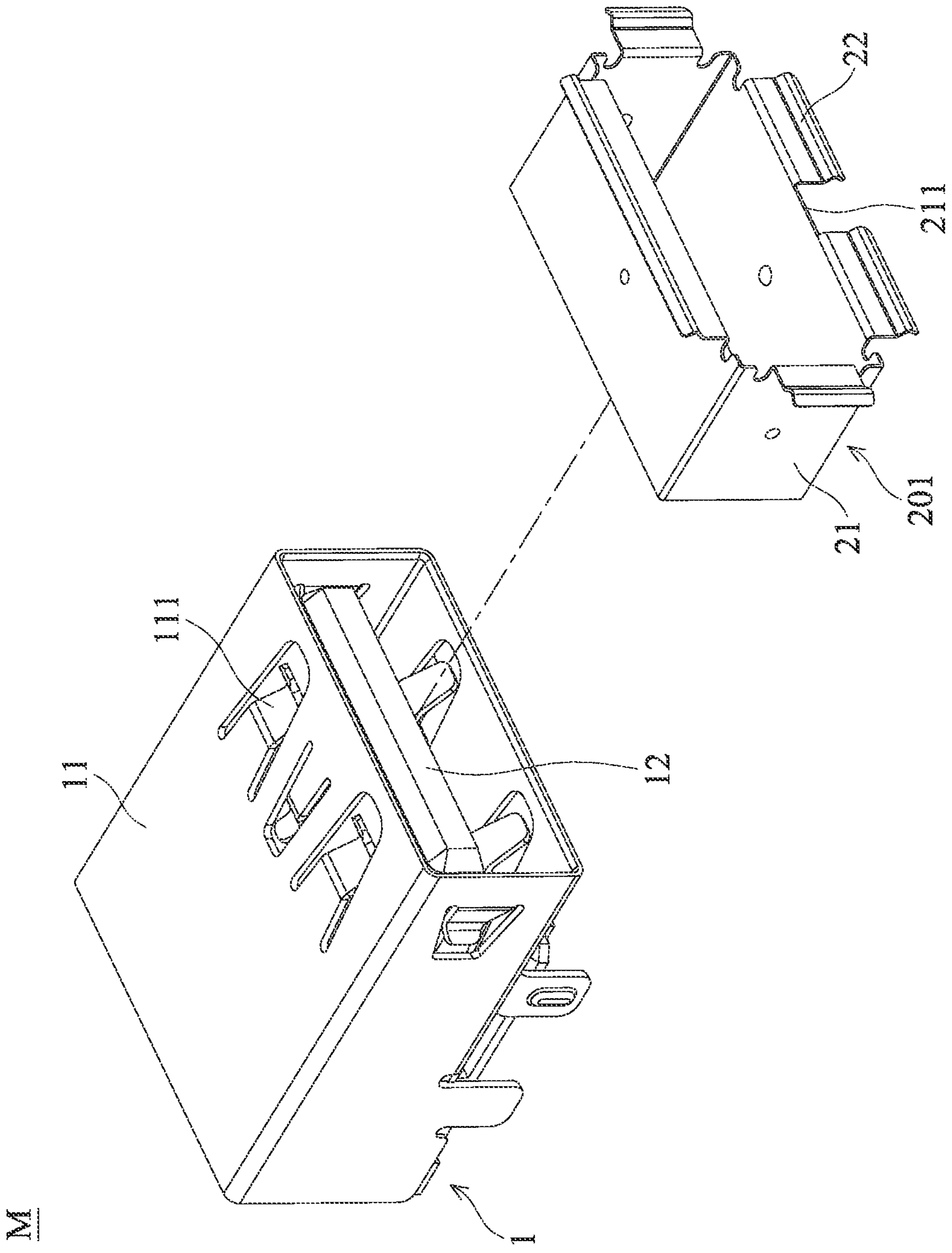
FIG. 1A is an exploded view of a socket module of an embodiment of the invention.
Figure 1B:
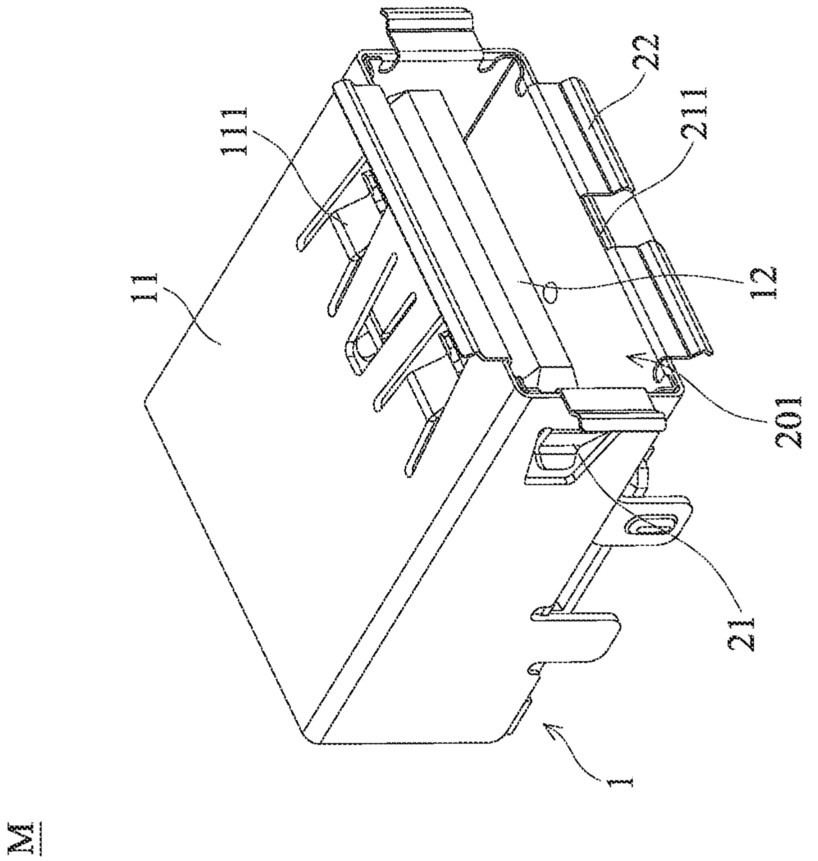
FIG. 1B is an assembled view of the socket module of the embodiment of the invention.

FIG. 1A is an exploded view of a socket module of an embodiment of the invention. FIG. 1B is an assembled view of the socket module of the embodiment of the invention. With reference to FIGS. 1A and 1B, the socket module M of the embodiment of the invention includes a socket 1 and a metal shielding frame 201. The socket 1 includes a socket case 11 and a socket joint 12. The socket case 11 surrounds the socket joint 12. The metal shielding frame 201 includes a sleeve-shaped frame body 21 and at least one ground hemming portion 22. The sleeve-shaped frame body 21 is made of a metal material and includes a first enclosed edge 211. The ground hemming portion 22 is formed on the first enclosed edge 211. The sleeve-shaped frame body 21 is located between the socket case 11 and the socket joint 12. In one embodiment, the sleeve-shaped frame body 21 is adapted to be inserted between the socket case 11 and the socket joint 12.

Figure 1C:
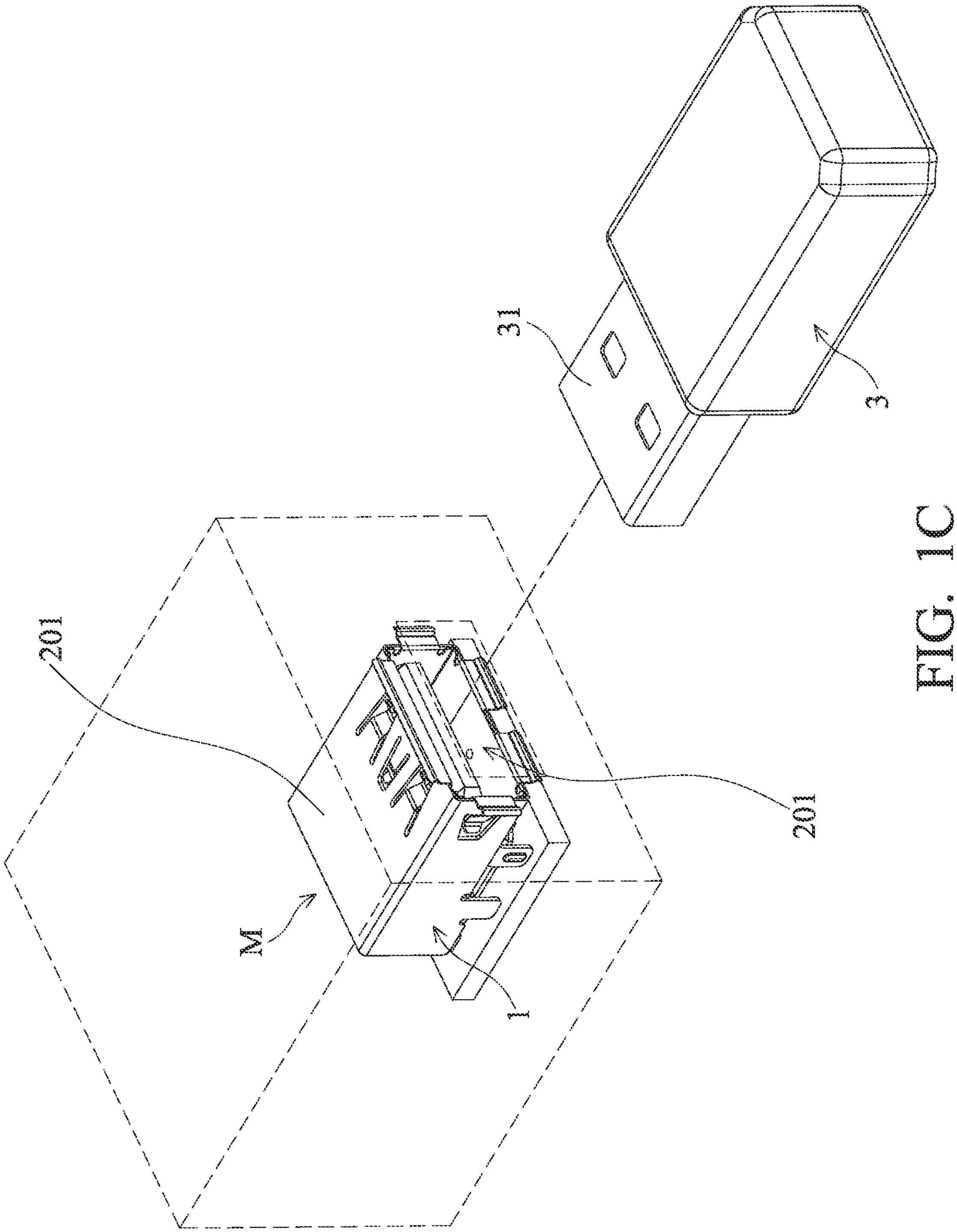
FIG. 1C shows the socket module of the embodiment of the invention being connected to a connector.

FIG. 1C shows the socket module of the embodiment of the invention being connected to a connector. With reference to FIG. 1C, the socket 1 is adapted to be electrically connected to the connector 3. Particularly, the connector 3 includes a connector case 31 and a connector joint (not shown). The connector case 31 surrounds the connector joint (not shown).

Figure 2A:
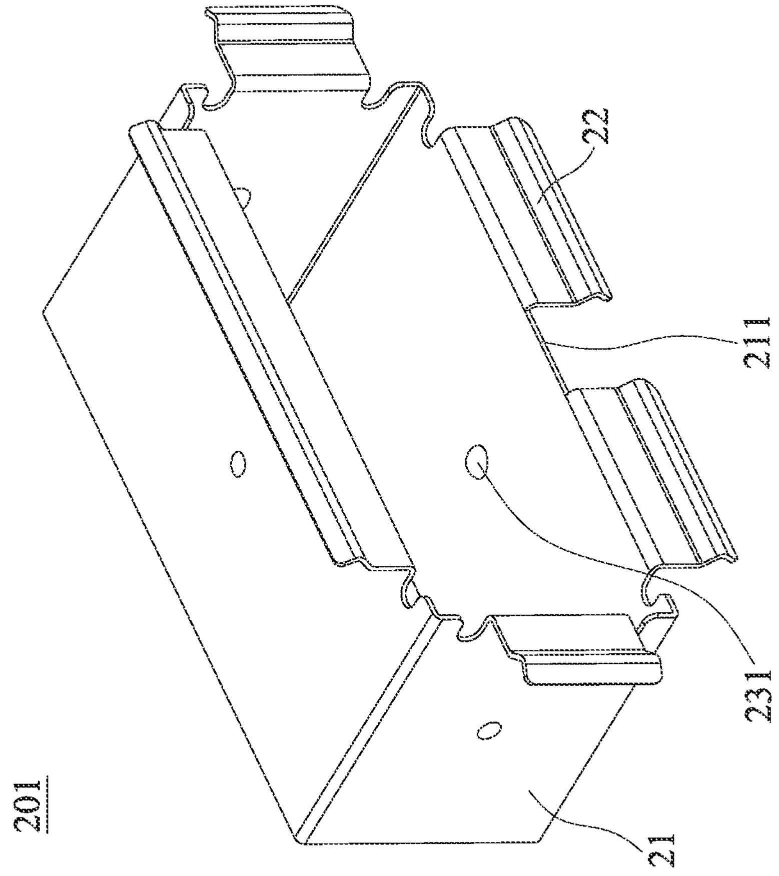
FIG. 2A shows a metal shielding frame of a first embodiment of the invention.

FIG. 2A shows a metal shielding frame of a first embodiment of the invention. With reference to FIG. 2A, in one embodiment, a plurality of protrusions 231 are formed on an inner wall of the sleeve-shaped frame body 21. The protrusions 231 are adapted to abut the connector case 31. The protrusions 231 compensate the tolerance, and the connector 3 can thus tightly fit to the metal shielding frame 201. In this embodiment, the metal shielding frame 201 compensates the tolerance, and the connector 3 is therefore sufficiently connected to the socket 1. The conventional problems of poor contact and noise leakage are prevented.

Figure 2B:
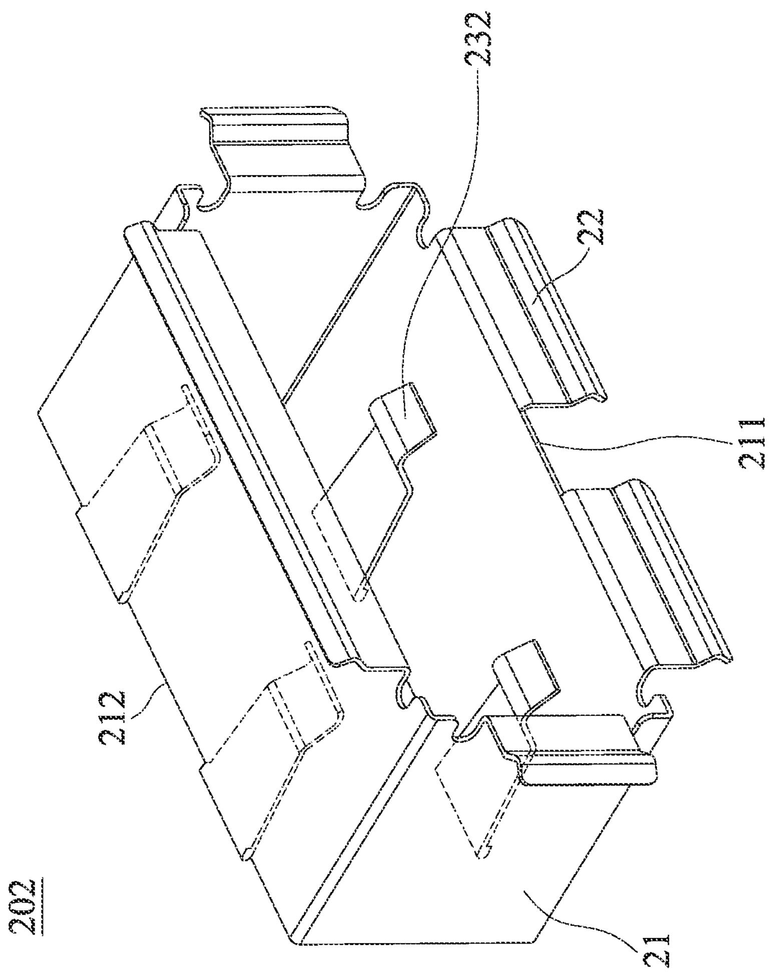
FIG. 2B shows a metal shielding frame of a second embodiment of the invention.
Figure 2C:
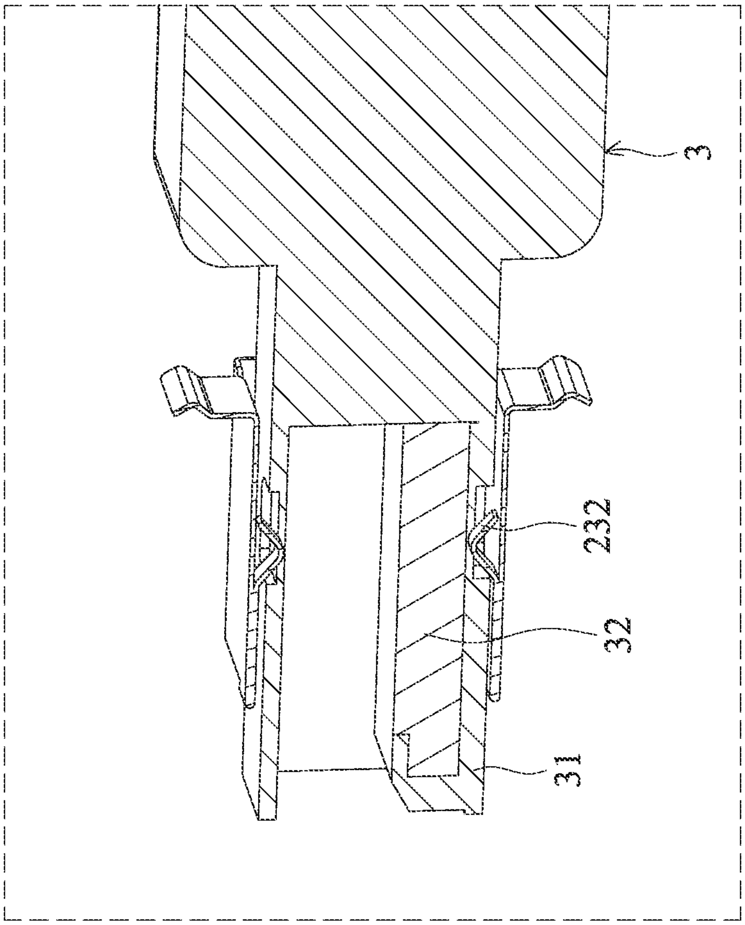
FIG. 2C shows the metal shielding frame of the second embodiment of the invention connected to the connector.

FIG. 2B shows a metal shielding frame of a second embodiment of the invention. FIG. 2C shows the metal shielding frame of the second embodiment of the invention connected to the connector. With reference to FIGS. 2B and 2C, in one embodiment, the metal shielding frame 202 further includes a plurality of elastic sheets 232. The sleeve-shaped frame body 21 includes a second enclosed edge 212. The elastic sheets 232 are formed on the second enclosed edge 212 (by bending) and extend to the interior of the sleeve-shaped frame body 21. The elastic sheets 232 are adapted to be wedged into the connector case 31. The connector case 31 surrounds the connector joint 32. The elastic sheets 232 compensate the tolerance, and the connector 3 can thus tightly fit to the metal shielding frame 202. In this embodiment, the metal shielding frame 202 compensates the tolerance, and the connector 3 is therefore sufficiently connected to the socket 1. The conventional problems of poor contact and noise leakage are prevented.

Figure 2D:
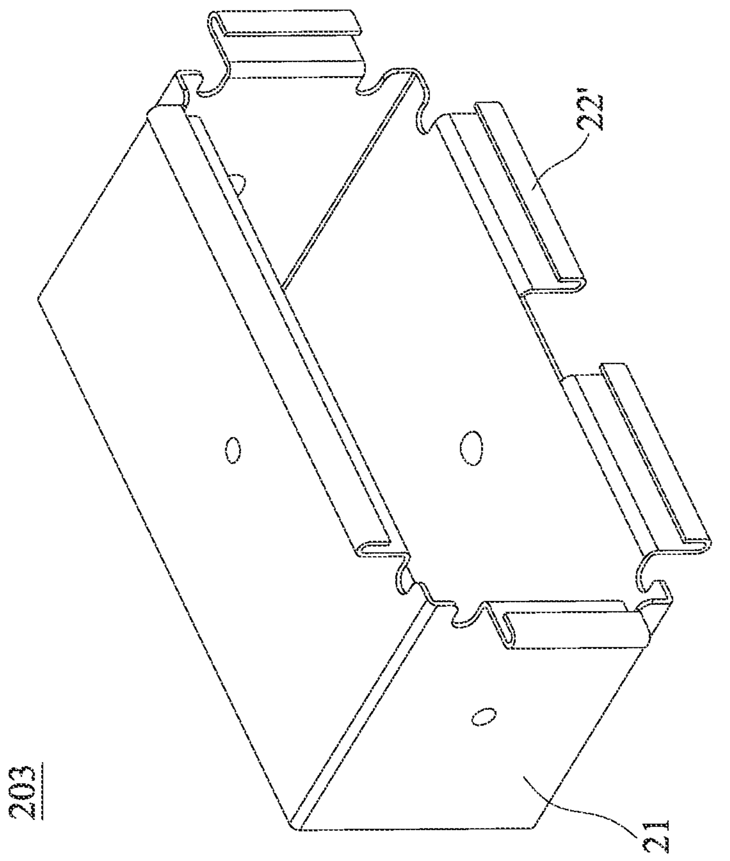
FIG. 2D shows a metal shielding frame of a third embodiment of the invention.

FIG. 2D shows a metal shielding frame of a third embodiment of the invention. With reference to FIG. 2D, in one embodiment, the ground hemming portion 22' of the metal shielding frame 203 is formed by another shape. The disclosure is not meant to restrict the invention.

With reference to FIGS. 1A and 1B, in one embodiment, the socket case 11 includes a plurality of socket wedging portions 111. The socket wedging portions 111 abut the sleeve-shaped frame body 21. The sleeve-shaped frame body 21 covers the socket wedging portions 111. Therefore, the metal shielding frame (201, 202 or 203) covers the gap around the socket wedging portions 111, and reduces noise interference.

Figure 3:
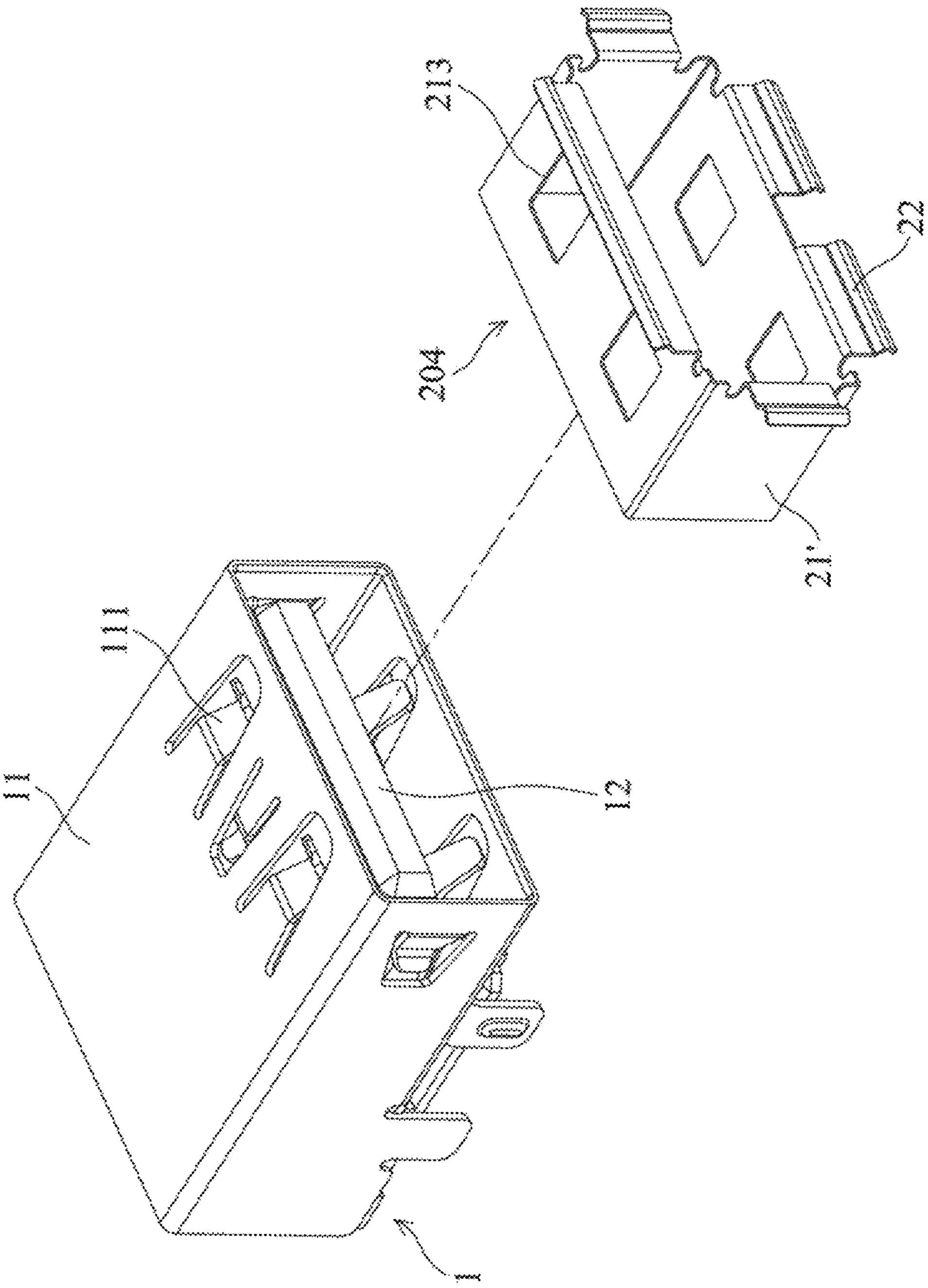
FIG. 3 shows a metal shielding frame and a socket of a fourth embodiment of the invention.

FIG. 3 shows a metal shielding frame and a socket of a fourth embodiment of the invention. With reference to FIG. 3, in one embodiment, a plurality of frame openings 213 are formed on the sleeve-shaped frame body 21' of the metal shielding frame 204. The socket case 11 includes a plurality of socket wedging portions 111. The socket wedging portions 111 are wedged into the frame openings 213. In this embodiment, the metal shielding frame 204 can be sufficiently connected to the socket 1.

Figure 4:
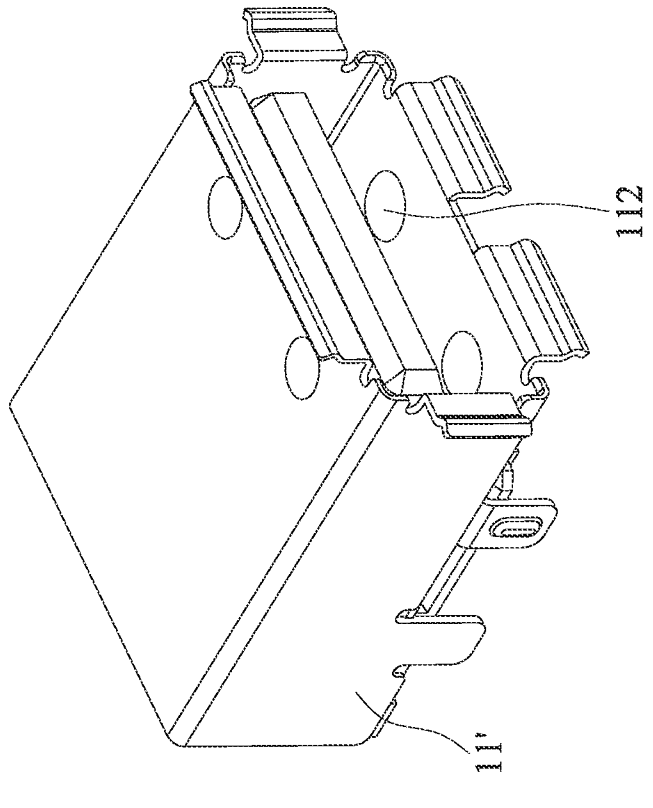
FIG. 4 shows a socket module of a fifth embodiment of the invention.

FIG. 4 shows a socket module of a fifth embodiment of the invention. With reference to FIG. 4, in this embodiment, the socket and the metal shielding frame are integrally formed. In other words, the structural characteristic of the metal shielding frame mentioned above is incorporated to the socket case 11' of the socket 1' of this embodiment. The socket case 11' has protrusions 112 adapted to abut the connector case 31. The protrusions 112 compensate the tolerance, and the connector 3 can thus tightly fit to the socket case 11'. In this embodiment, there is no opening on the side wall, the top wall and the bottom wall of the socket case 11', and the noise interference is reduced.

Figure 5A:
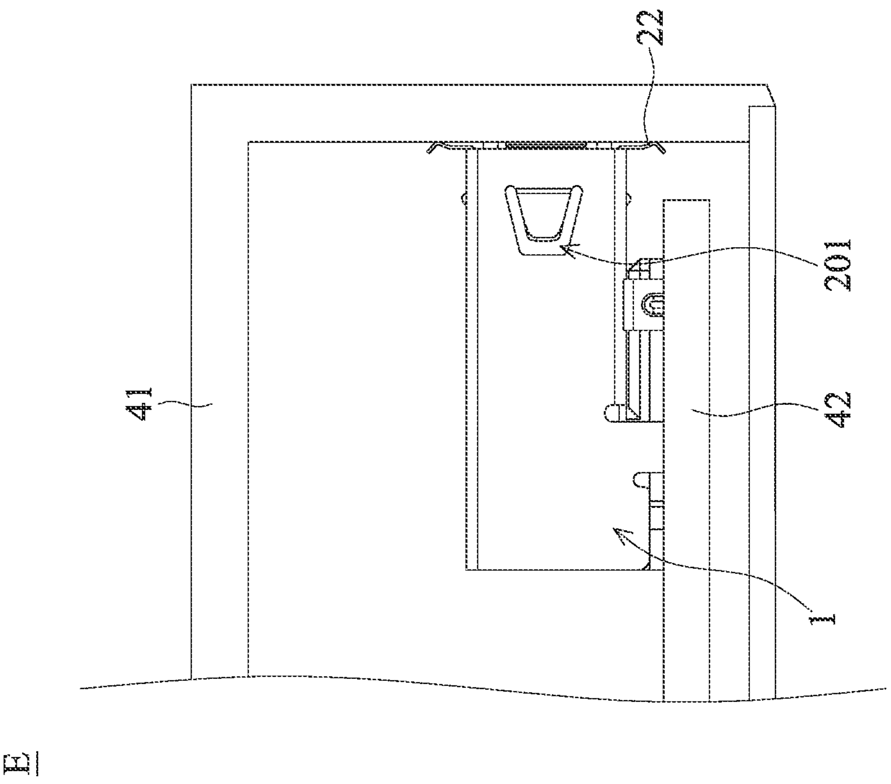
FIG. 5A shows an electronic device of the embodiment of the invention.

FIG. 5A shows an electronic device of the embodiment of the invention. With reference to FIG. 5A, the electronic device E of the embodiment of the invention includes a metal housing 41, a circuit board 42, the socket 1 mentioned above and the metal shielding frame 201 mentioned above. The circuit board 42 is disposed in the metal housing 41. The socket 1 is disposed on the circuit board 42. The ground hemming portion 22 abuts the metal housing 41. In the embodiment of the invention, the ground hemming portion 22 abuts the interior of the metal housing 41. Therefore, when the connector 3 is pulled out from the socket 1, the metal shielding frame 201 is restricted by the metal housing 41 from being removed with the connector 3.

Figure 5B:
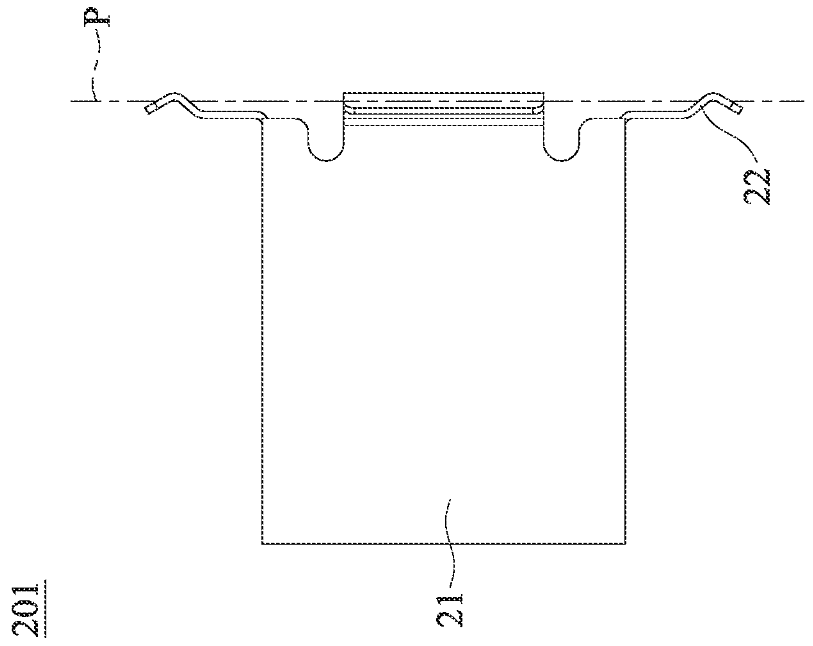
FIG. 5B shows the details of the ground hemming portion of the embodiment of the invention.

FIG. 5B shows the details of the ground hemming portion of the embodiment of the invention. With reference to FIG. 5B, in one embodiment, the ground hemming portion 22 protrudes over a combination plane P at which the metal housing 41 is combined with the metal shielding frame 201. Thus, after the assembly, the ground hemming portion 22 presses the metal housing 41 continuously (applies elastic force on the metal housing 41), and provides reliable grounding function. In this embodiment, the metal shielding frame 201 is grounded to the metal housing 41 of the electronic device E, and the noise is reduce by being transmitted to the metal housing 41.

Compared to the conventional art (without utilizing the metal shielding frame), the metal shielding frame with no frame opening (for example, the metal shielding frame of the first, second or third embodiment) of the embodiment of the invention can decrease the noise radiation energy by 90%. Additionally, the metal shielding frame with the frame openings (for example, the metal shielding frame of the fourth embodiment) of the embodiment also can sufficiently reduce the noise radiation energy due to the grounding and tolerance compensation means.

The metal shielding frame of the embodiment of the invention can be directly inserted into the conventional socket to reduce noise interference. In one embodiment, the metal shielding frame compensates the tolerance so that the connector can be sufficiently connected to the socket, and the conventional problems of poor contact and noise leakage are prevented. In another embodiment, the metal shielding frame covers the gap around the socket wedging portions, and reduces noise interference. In further another embodiment, the metal shielding frame is grounded to the metal housing of the electronic device, and the noise is reduce by being transmitted to the metal housing.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
- a metal housing;
- a circuit board, disposed in the metal housing;
- a socket, disposed on the circuit board, wherein the socket comprises a socket case and a socket joint, and the socket case surrounds the socket joint; and
- a metal shielding frame, comprising a sleeve-shaped frame body and at least one ground hemming portion, wherein the sleeve-shaped frame body comprises a first enclosed edge, the ground hemming portion is formed on the first enclosed edge, the sleeve-shaped frame body is located between the socket case and the socket joint, and the ground hemming portion abuts the metal housing,
- wherein a plurality of protrusions are formed on an inner wall of the sleeve-shaped frame body, and there is no opening formed on the inner wall.

2. The electronic device as claimed in claim 1, further comprising a connector, wherein the connector comprises a connector case and a connector joint, the connector case surrounds the connector joint, and the socket is adapted to be electrically connected to the connector.

3. The electronic device as claimed in claim 2, wherein the protrusions are adapted to abut the connector case.

4. The electronic device as claimed in claim 2, wherein the metal shielding frame further comprises a plurality of elastic sheets, the sleeve-shaped frame body comprises a second enclosed edge, the elastic sheets are formed on the second enclosed edge and extend to an interior of the sleeve-shaped frame body, and the elastic sheets are adapted to be wedged into the connector case.

5. The electronic device as claimed in claim 1, wherein the sleeve-shaped frame body is adapted to be inserted between the socket case and the socket joint.

6. The electronic device as claimed in claim 1, wherein the socket case comprises a plurality of socket wedging portions, and the sleeve-shaped frame body covers the socket wedging portions.

7. A socket module, comprising:
- a socket, comprising a socket case and a socket joint, wherein the socket case surrounds the socket joint; and
- a metal shielding frame, comprising a sleeve-shaped frame body and at least one ground hemming portion, wherein the sleeve-shaped frame body comprises a first enclosed edge, the ground hemming portion is formed on the first enclosed edge, the sleeve-shaped frame body is located between the socket case and the socket joint, wherein a plurality of protrusions are formed on an inner wall of the sleeve-shaped frame body, and there is no opening formed on the inner wall.

8. The socket module as claimed in claim 7, wherein the socket and the metal shielding frame are integrally formed.

9. The socket module as claimed in claim 7, wherein the sleeve-shaped frame body is adapted to be inserted between the socket case and the socket joint.

10. The socket module as claimed in claim 7, wherein the socket case comprises a plurality of socket wedging portions, and the sleeve-shaped frame body covers the socket wedging portions.

11. A socket module, comprising:
- a socket, comprising a socket case and a socket joint, wherein the socket case surrounds the socket joint; and
- a metal shielding frame, comprising a sleeve-shaped frame body and at least one ground hemming portion, wherein the sleeve-shaped frame body comprises a first enclosed edge, the ground hemming portion is formed on the first enclosed edge, the sleeve-shaped frame body is located between the socket case and the socket joint,
- wherein the metal shielding frame comprises a plurality of elastic sheets, the sleeve-shaped frame body comprises a second enclosed edge opposite the first enclosed edge, the elastic sheets are formed on the second enclosed edge and extend to an interior of the sleeve-shaped frame body, and there is no opening formed on an inner wall of the sleeve-shaped frame body.

12. The socket module as claimed in claim 11, wherein the socket and the metal shielding frame are integrally formed.

13. The socket module as claimed in claim 11, wherein the sleeve-shaped frame body is adapted to be inserted between the socket case and the socket joint.

14. The socket module as claimed in claim 11, wherein the socket case comprises a plurality of socket wedging portions, and the sleeve-shaped frame body covers the socket wedging portions.

* * * * *